UNITED STATES PATENT OFFICE.

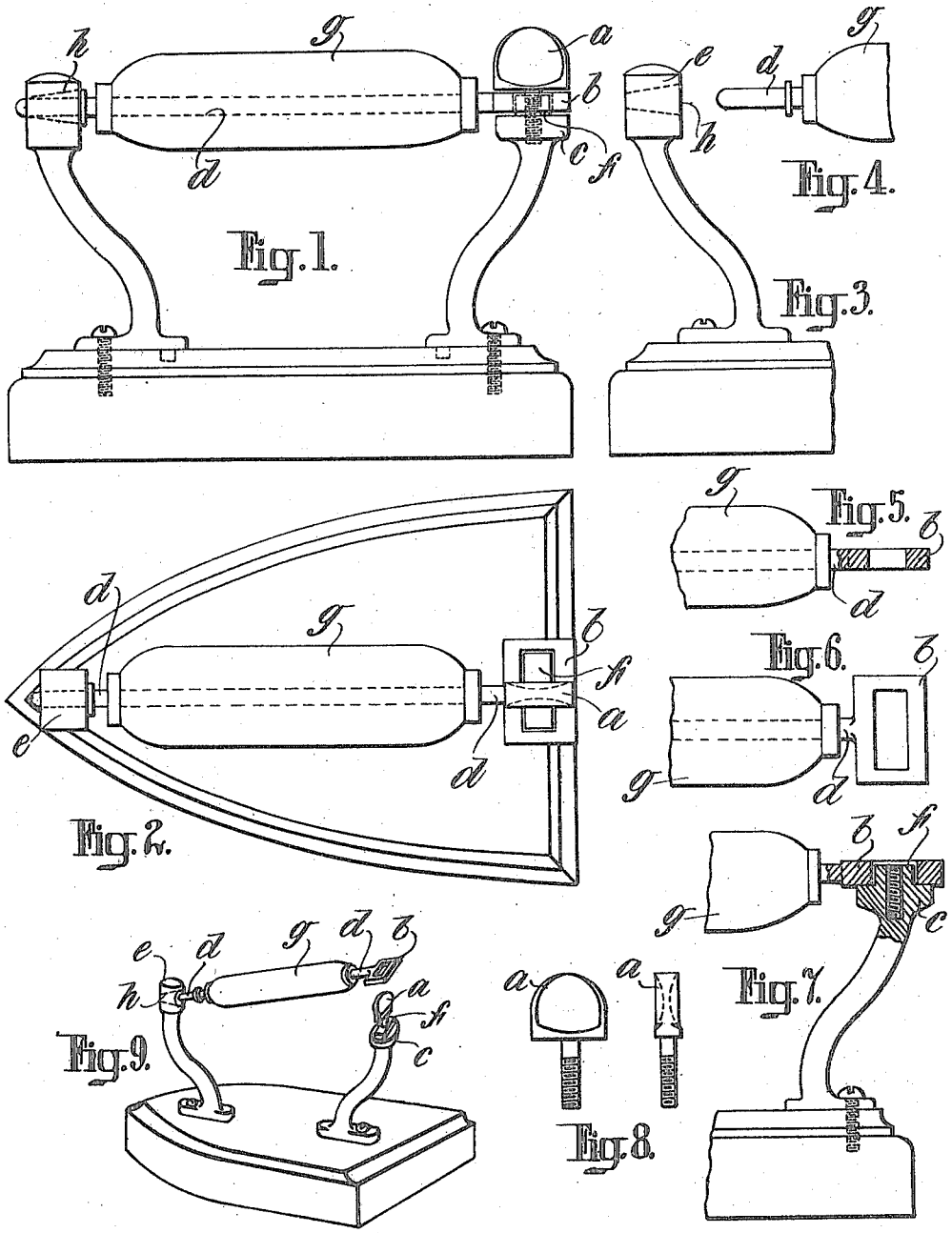

MARY JOSEPHINE BAKER, OF FETHARD, IRELAND.

HAND-IRON.

1,270,587.

Specification of Letters Patent.  Patented June 25, 1918.

Application filed April 24, 1917. Serial No. 164,277.

*To all whom it may concern:*

Be it known that I, MARY JOSEPHINE BAKER, a subject of the King of Great Britain and Ireland, residing at Bank House, Fethard, county of Tipperary, Ireland, have invented certain new and useful Improvements in Hand-Irons; and I do hereby declare the following to be a full, clear, and exact description of the invention, such as will enable others skilled in the art to which it appertains to make and use the same.

This invention relates to a detachable and adjustable handle for flat irons.

The object of this invention is to provide a handle which can be easily detached from and placed in position upon the iron, so that, by detaching the said handle when the iron is placed upon the fire or other heating agent or apparatus, the handle will not become heated; while after the removal of the iron from the fire or heating apparatus the said handle may be placed in position, thus affording a cool grip and avoiding the necessity of employing the cumbersome and awkward holders which are now generally used with such irons.

And in order that my said invention may be better understood I will now proceed to describe the same with reference to the drawing accompanying this specification, which shows one method of constructing a hand iron according to the said invention.

Figure 1 is a side elevation of a flat iron, showing the handle in position.

Fig. 2 is a plan of same.

Figs. 3 to 9 show details illustrating the construction and assembling of the parts.

The same letters of reference are employed to denote the same parts in all the views.

The body of the iron which may be of any ordinary shape is provided with two uprights. The upper portion $e$ of the front upright is provided with a tapering hole $h$. $g$ is a handle of wood or other heat insulating material, having a metal core or rod $d$ passing therethrough. This rod $d$ projects from one end of the handle and is adapted to fit into the tapering hole $h$ in the upper portion $e$ of the front upright, as shown at Figs. 3 and 4. The other upright is provided at the top $c$ with a stepped portion $f$, of rectangular shape, in which is provided a screw threaded hole.

The rod or core $d$ is prolonged into or formed with a flattened plate $b$, having a rectangular slot adapted to fit over the stepped portion $f$. $a$ is a fly nut adapted to screw into the hole in the top $c$ of the rear upright.

The method of using the device will be evident. The handle is detached when it is required to heat the iron. After this heating has been effected, it is simply necessary to take the handle to insert the forward end of the rod $d$ into the tapering hole $h$, see Figs. 3, 4, and 9, to fit the plate $e$ over the projection $f$ see Fig. 7 and then to screw in the thumb screw $a$, bringing the head thereof into the transverse position shown at Figs. 1 and 2, after which the handle is held securely in position.

In order to detach the handle it is not necessary to remove the thumb screw. It may if desired be simply turned into the position shown at Fig. 9, whereupon the handle $g$ may be removed.

It will be understood that the particular construction just described and illustrated is given merely by way of example, as the method of carrying out the invention may be varied within the scope of the appended claims without departing from the principle of the said invention.

What I claim as my invention and desire to secure by Letters Patent of the United States of America is:—

1. In a hand iron, the combination of a body portion, two uprights, one of such uprights being provided with a hole and the other with a projection, an insulating handle having protruding from one end thereof a rod adapted to fit into the beforementioned hole in one of the uprights, and having protruding beyond the other end thereof a plate adapted to fit over the projection on the other upright, and means for securing the said plate in position substantially as described.

2. In a hand iron, the combination of a body portion, two uprights, one of such uprights being provided with a hole directed in the longitudinal axis of the iron and tapering outward toward the body thereof, the other upright being provided at the top with a projecting stepped portion, an insulating handle, a rod projecting from one end of said handle and adapted to fit into the beforementioned tapering hole, a plate protruding beyond the other end of the insulating handle and adapted to fit over the stepped portion on the second upright, an internally screw threaded hole in the said stepped portion, and a thumb screw adapted to screw into the said hole and hold the plate and handle securely in position, substantially as described.

In testimony whereof, I affix my signature.

MARY JOSEPHINE BAKER.

Witnesses:
RICHARD EDWARD BAKER,
EDWARD L. ADAMS, Jr.

Copies of this patent may be obtained for five cents each, by addressing the "Commissioner of Patents, Washington, D. C."